B. W. LEFFERDINK.
AUTOMATIC JACK FOR VEHICLES.
APPLICATION FILED MAY 7, 1915.
1,217,320.
Patented Feb. 27, 1917.
2 SHEETS—SHEET 2.
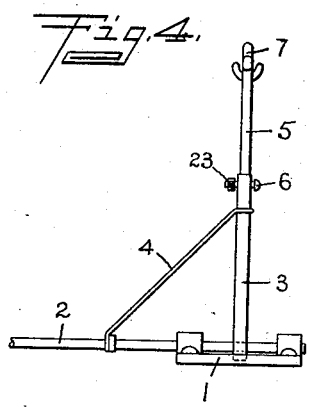
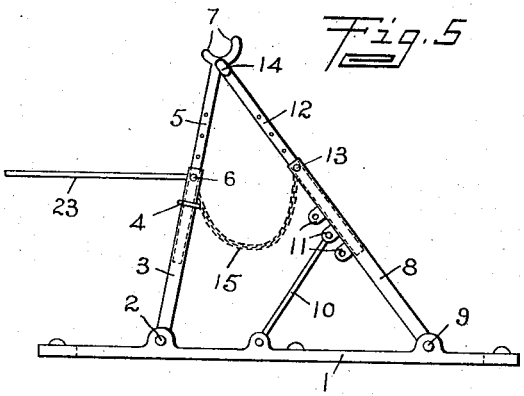
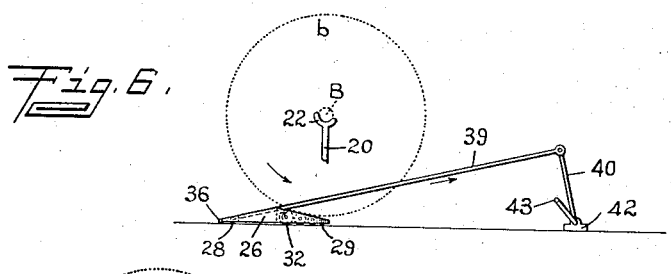
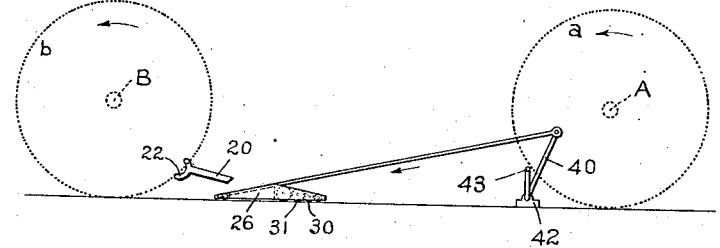
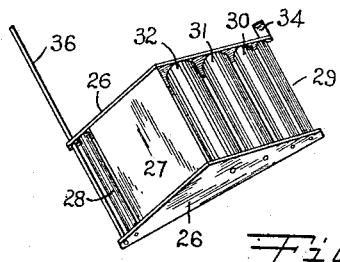
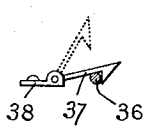
B. W. Lefferdink, Inventor.
Witness
A. W. Jamieson
By David O. Barnell,
Attorney.

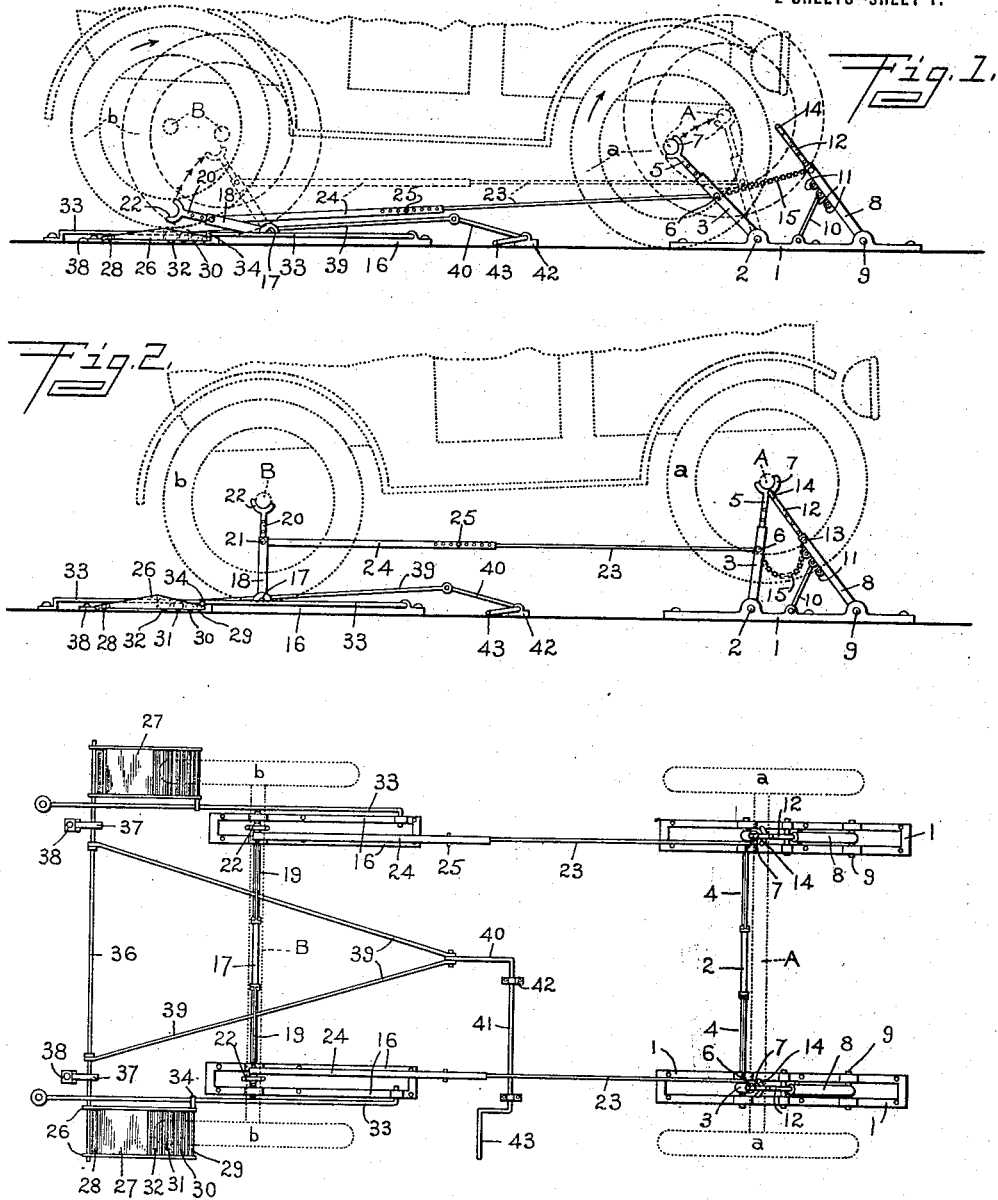

UNITED STATES PATENT OFFICE.

BEREND W. LEFFERDINK, OF NEAR FIRTH, NEBRASKA.

AUTOMATIC JACK FOR VEHICLES.

1,217,320.   Specification of Letters Patent.   Patented Feb. 27, 1917.

Application filed May 7, 1915. Serial No. 26,649.

*To all whom it may concern:*

Be it known that I, BEREND W. LEFFERDINK, a citizen of the United States, residing near Firth, in the county of Lancaster and State of Nebraska, have invented certain new and useful Improvements in Automatic Jacks for Motor-Vehicles, of which the following is a specification.

My invention relates to jacks for elevating the axles of vehicles to raise the wheels thereof off the ground. It is the object of my invention to provide a jack for use with motor vehicles, whereby both the front and rear wheels of the vehicle may be raised off the ground or floor, the jack operating automatically by the mere act of running the vehicle onto the same. A further object of my invention is to provide means by which the vehicle may be driven off the jack under its own power, and means for automatically resetting the parts in positions ready to again elevate the vehicle when the latter is driven onto the jack. Further objects of my invention relate to specific structural features thereof, such as the provision of means for adjusting the mechanism for use with vehicles of different size. My mechanism is intended especially to be installed in the garage or other permanent storage place for the vehicle with which it is used, and serves to prevent the vehicle being driven past the desired location thereof, as well as to avoid injury to the pneumatic tires by sustaining the weight of the vehicle at one place thereon for a long time.

In the accompanying drawings, Figure 1 is a side view of a mechanism embodying my invention, showing the same in position to receive the vehicle, and indicating an intermediate position of the parts assumed in elevating the vehicle, Fig. 2 is a similar view showing the positions of the operating parts when the vehicle is mounted thereon, Fig. 3 is a plan view of the same, Fig. 4 is a detail rear view of one of the front jack-members, Fig. 5 is a detail side view of the same, Figs. 6 and 7 are diagrammatic side views illustrating the demounting and resetting operations, Fig. 8 is a perspective view of one of the demounting-blocks, and Fig. 9 is a detail side view of one of the hooks for holding the demounting-blocks out of operative position.

In carrying out my invention I provide a pair of pivoted or rocking jack-devices for engaging the front axle, and a similar pair of devices for the rear axle of the vehicle, the pairs of devices being connected with each other so that their operations are suitably coördinated. Each of the jack-devices for the front axle has a frame or base 1 with laterally-spaced side-portions, the two bases being disposed parallel to each other, suitably spaced transversely, and secured to the floor of the garage or storage place for the vehicle. A shaft 2 extends transversely through bearings therefor in the rearward parts of the frames 1, and to said shaft, between the side-portions of each frame, is secured the lower end of a tubular arm 3. Diagonal brace-rods 4 extend from the upper parts of the arms to the intermediate portions of the shaft, as shown clearly in Fig. 4, to increase the lateral stability of the arms. In the upper end of each of the tubular arms a bar 5 is slidably disposed, said bar having a series of transverse openings therein to receive a pin 6 by which it is secured in vertically-adjusted relations to the arm. At the upper end of the bar 5 is a semi-circular head or socket 7 adapted to fit around the lower side of the axle A of a motor-vehicle, and preferably the front side of the socket extends slightly higher than the rear side thereof, when the bar is in vertical position. Near the front end of each of the bases 1 a tubular arm 8 is pivotally connected therewith, said arm normally extending diagonally upward and rearward from the pivot-pin 9. A brace-rod 10 is pivoted to the base between the lower ends of the arms 3 and 8, and the upper end of said brace-rod may be connected with any one of a series of perforate lugs 11 on the rearward side of the arm 8, so as to retain said arm at adjusted inclinations to the base. In the upper end of the arm 8 a bar 12 is slidably disposed, being held in any one of a series of adjusted positions by means of a transverse pin 13 which passes through one of a number of perforations in the bar. At the upper end of the bar is a fork or seat 14 adapted to engage the head 7 of the bar 5 to form a stop for limiting the forward swinging movement of the arm 3. Rearward swinging of the arm 3 may be limited by means of a chain 15 of which the ends are connected with the arms 3 and 8, as shown.

The jack devices for the rear axle of the vehicle have bases 16 alined longitudinally with the bases 1, and secured to the floor at at a suitable distance therefrom. A transverse shaft 17 has bearings in said bases, tubular arms 18 are secured to said shaft, said arms are braced by rods 19, each arm has a bar 20 fitting slidably therein and secured at adjusted position by a pin 21, and the bars 20 have heads or sockets 22 adapted to fit around the lower side of the axle B of the vehicle. The several parts of the rear jack-devices are substantially identical with the corresponding parts of the front jack-devices, except that the rear sides of the sockets or heads 22 are preferably made highest instead of the front sides thereof.

At each side of the mechanism the rocking arm 3 of the front jack-device is connected with the arm 18 of the rear jack-device by means of a rod of variable length. In the structure shown said connecting rod is formed by a front rod-portion 23 connected to the pin 6, and a rear tubular portion 24 connected with the pin 21, the end of the rod 23 fitting slidably within the tube 24 and being secured in adjusted relation thereto by a pin 25 passing through one of a series of transverse holes therein.

In the use of the mechanism, the bases 1 and 16 are so disposed and secured upon the floor that the distance between the transverse shafts 2 and 17 is slightly less than the distance between the front and rear axles A and B of the vehicle with which the mechanism is used. The length of the longitudinal connecting rods is so adjusted that when the rear arms 18 are in vertical position the front arms 3 will be inclined forwardly in positions such that the distance between the heads 7 and 22 is the same as the distance between the vehicle-axles. The arms 8 are adjusted to a suitably inclined position, as shown, and the bars 12 are adjusted so that the heads 14 will engage the sockets 7 and stop the forward swinging movement of the arms 3 when the rear arms 18 are vertical or inclined forward but very slightly. The bars 5 are so adjusted with reference to the arms 3 that when said arms are inclined rearwardly as far as permitted by the chains 15 the heads or sockets 7 are at the level of the front axle A when the front wheels a are resting upon the floor. As the longitudinal connecting rods are slightly longer than the distance between the shafts 2 and 17, when the front arms 3 are rearwardly inclined the rear arms 18 will have a greater inclination from the vertical, being at positions such as shown in Fig. 1, so that the front axle of the vehicle can pass freely over them without engagement therewith.

The various parts being properly adjusted and the rocking arms 3 and 18 being in the rearwardly inclined positions shown by the full lines in Fig. 1, if the vehicle is driven over the mechanism, in proper transverse relation thereto, the front axle A will engage the heads or sockets 7 and swing the arms 3 forwardly so that the heads are thereby raised and the front axle elevated so as to lift the wheels a off the floor. As the forward swinging movement is continued, and at about the time the arms 3 reach a vertical position, the sockets 22 of the rear jack-devices swing up into a position at which they will engage the rear axle B, an intermediate transitory position thereof being shown by dotted lines in Fig. 1. As long as the rear wheels b remain in engagement with the floor the vehicle may be driven by its own power transmitted through said wheels, and the mechanism is so arranged that the rear wheels will remain upon the floor until about the time that the elevation of the front axle is completed by the movement of the arms 3 to the vertical position. Then during the completion of the forward swinging movement the rear arms 18 are brought to a vertical position, and in so doing the rear axle is elevated and the rear wheels raised out of contact with the floor. At the same time that the rear wheels are lifted, however, the front part of the vehicle descends slightly, due to the swinging of the arms 3 to the forwardly inclined position, and the power supplied by the lowering of the front part of the vehicle will substantially compensate for the power necessary to elevate the rear portion thereof. Thus it is only necessary for the vehicle to have a slight momentum at the time the front jacks reach the vertical position, in order that the raising of both the front and rear axles may be done by power derived directly or indirectly from the vehicle itself. It will be noted also that even though there is a continued application of power to the rear wheels, said wheels cannot propel the vehicle after the rear axle is elevated, and the vehicle is thus prevented from passing beyond the desired location thereof.

In order that the vehicle may be demounted from the jack mechanism under its own power, means are provided for effecting an operative connection of the rear wheels b with the floor, so that the power supplied to said wheels may be utilized. For this purpose there are provided two demounting-blocks each of which comprises parallel side-pieces 26, a transverse inclined tread-portion 27, a roller 28 mounted between the rear ends of the side-pieces, and rollers 29, 30, 31 and 32 mounted between the front portions of the side-pieces. The last-named series of rollers increase gradually in diameter from the first to the last, and the axes of all of the rollers are so arranged that the lower sides of the rollers are in the same horizontal plane. The upper side of the largest roller, 32, is at the same level as the upper or front edge of the inclined tread-portion 27. At the sides of the bases 16 longitudinal guide-rods 33 are connected therewith and extend rearwardly therefrom. Lugs 34 on the inner sides of the demounting-blocks fit slidably upon said guide-rods, and the rear ends of the blocks are connected with each other by a transverse rod 36. Latch-hooks 37 are pivoted on blocks 38 secured on the floor, the hooks being adapted to engage the transverse rod 36 to prevent forward movement of the blocks. Rods 39 are pivotally connected with the rod 36 and extend diagonally forward therefrom, being connected at their front ends with a crank arm 40 on one end of a transverse shaft 41 which is mounted in bearings 42 disposed between the front and rear jack devices, as shown. On the other end of said shaft 41 is a crank 43 which is arranged so as to be in longitudinal alinement with the wheels at one side of the vehicle.

Normally, the demounting-blocks are held at a position considerably behind the transverse shaft 17 of the rear jack-devices, the hooks 37 being engaged with the rod 36, the crank-arm 40 extending slightly upward from a horizontal position, and the crank 43 resting upon the floor, as shown in Figs. 1, 2 and 3. When the vehicle is to be demounted from the jack mechanism, the hooks 37 are disengaged from the cross-rod 36, and the blocks are pushed forward manually until the rollers at the front parts thereof engage the tires of the rear wheels b, as represented in Fig. 6. At this position the rollers form a wedge-like connection between the wheels and the floor, and the cranks 40 and 43 are raised toward a vertical position. The power of the vehicle is then applied to rotate the wheels rearwardly, and the motion thereof, being communicated to the rollers, tends to drive the blocks forwardly so that the same will receive more of the weight of the vehicle and thus increase the rearward traction of the wheels thereon. The vehicle will thus be moved rearwardly under its own power, and in so doing will reset the jack devices to the rearwardly inclined position thereof. One of the front wheels a in passing the crank-shaft 41 will engage the crank 43 and turn the same rearward to a horizontal position. The demounting-blocks are thus moved rearwardly to their normal position at which the hooks 37 engage and hold the cross-rod 36, and the entire mechanism is thus reset ready for use when the vehicle is again driven onto it. It should be noted that when the demounting blocks are in their normal position they are far enough to the rear not to interfere with the elevating operation of the jack mechanism, and that the blocks are retained in such position until they are manually released and pushed forward. The cross-rod 36, by striking the rear ends of the bases 16, also limits the distance to which the blocks may move forward when they are drawn beneath the wheels during the demounting operation.

Now, having described my invention, what I claim and desire to secure by Letters Patent is:

1. In a mechanism of the class described, rocking jack-members adapted to engage the front and rear axles of a motor vehicle to raise the wheels thereof out of engagement with a floor during forward movement of the vehicle, and movable blocks adapted to be inserted between the wheels and floor to form a tractive connection whereby the vehicle may be moved rearwardly under its own power to disengage the axles from the jack-members.

2. The combination with jack mechanism for sustaining a motor vehicle with the wheels thereof near but out of engagement with a floor, of demounting-blocks having a plurality of rollers journaled thereon and adapted to be disposed between the floor and the traction-wheels of the vehicle to form an operative connection between said wheels and the floor, whereby the traction of the wheels may pull the vehicle off the jack mechanism.

3. The combination with jack mechanism for sustaining a motor vehicle with the wheels thereof near but out of contact with a floor, of demounting-blocks each having a series of rollers of graduated diameter mounted therein, the blocks being insertible beneath the traction-wheels of the vehicle with the smaller rollers engaging the floor and the wheel-tires, and means for limiting longitudinal movement of the blocks.

4. In a mechanism of the class described, rocking jack-members adapted to engage the front and rear axles of a motor vehicle to raise the vehicle-wheels out of contact with a floor by and during forward movement of the vehicle, movable demounting-blocks having rollers adapted to enter between the floor and the vehicle-wheels to form a tractive connection between the same, means for holding the demounting-blocks at a fixed position during movement of the vehicle onto the jack-members, and means actuated by the vehicle for resetting the demounting-blocks to said position during movement of the vehicle away from the jack-members

B. W. LEFFERDINK.

Copies of this patent may be obtained for five cents each, by addressing the "Commissioner of Patents, Washington, D. C."